June 6, 1944.  L. A. FRY  2,350,603
CITRUS FRUIT JUICE EXTRACTOR
Filed Dec. 16, 1941
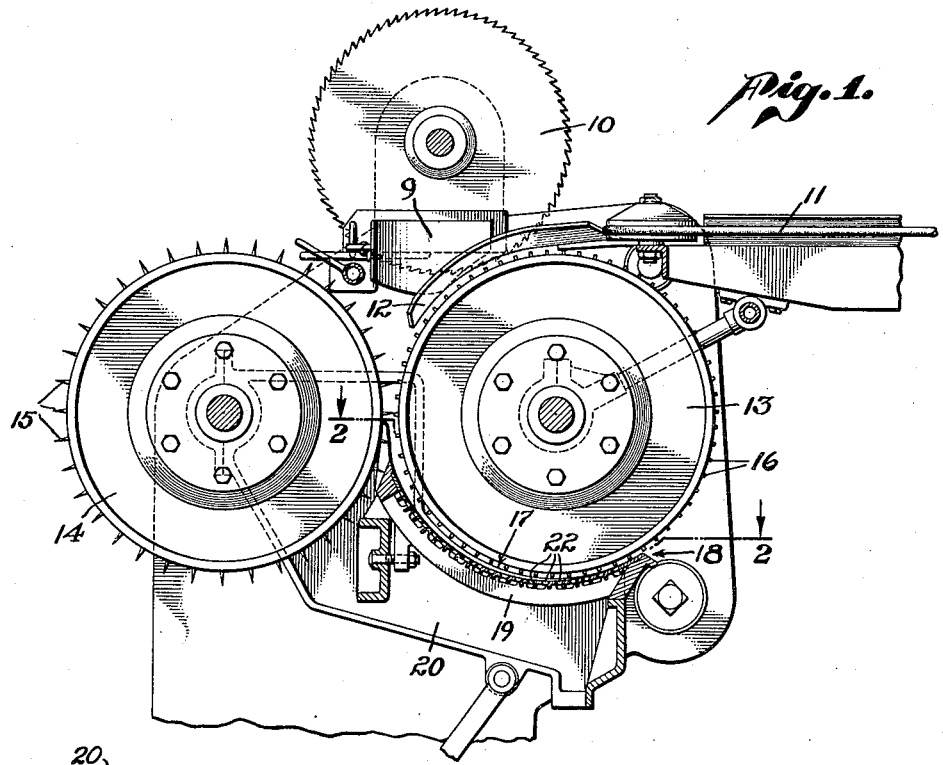
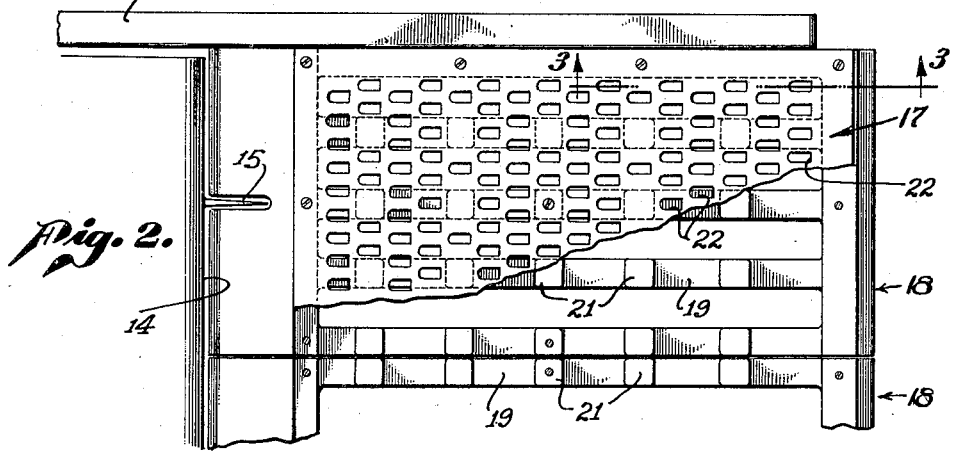
LAWRENCE A. FRY,
INVENTOR
BY
ATTORNEY.

Patented June 6, 1944

2,350,603

UNITED STATES PATENT OFFICE 2,350,603

CITRUS FRUIT JUICE EXTRACTOR

Lawrence A. Fry, Hollywood, Calif., assignor, by mesne assignments, to General Foods Corporation, New York, N. Y., a corporation of Delaware Application December 16, 1941, Serial No. 423,202

4 Claims. (Cl. 100—47)

This invention relates to apparatus for separating citrus fruit into its separate components, and more particularly to the type of machine shown in my prior Patent Number 2,212,066, issued August 20, 1940.

One of the important uses of machines of this type is the extraction of citrus fruit juices. In recent years there has been a considerable increase in the market for pure fruit juices. As distinguished from ades and diluted, carbonated drinks, in which various flavors are added to the juice, it is essential that pure juice of this nature be relatively free of several ingredients which are present in the fruit, and which will be released with the juice unless great care is used in the expression of the juice.

In the course of experimentation, it has been discovered that the juice, and the walls of the juice sacs, if separated from the rest of the fruit, yield a product which is satisfactory for the market as pure juice. On the other hand, such juice, if contaminated by compounds present in the locular walls, rind oils, the white pithy portions, or the oil bearing rind, does not possess satisfactory characteristics. Specifically, the locular walls, the pithy axis and the inner pithy rinds contain, among other things glucosides, which impart to the juice an unpleasant taste, which increases as the juice is kept after extraction. The oil from the rind changes the color of the extracted juice, and, if too much is present, also has a deleterious effect on the quality of the product. Of all of these various contaminating constituents, perhaps the most difficult to keep out of the expressed juice is the locular wall tissue, which, unless great care is exercised, is separated from the rind and admixes with the juice.

Ideally, perhaps, the fruit can be made to yield pure juice by removing segments of the pulp from between the locular walls, and extracting the juice from such pulp. This would be a very expensive operation, however, and commercially impractical. It has been found, however, that the juice can be pressed from the fruit without actually separating the juice bearing portions from the rest of the fruit, provided that the locular walls, the axis and the rinds are not masticated in the process, and provided also that the oil from the outer rind is not permitted to mix with the expressed juice. It is this mode of separation that is practiced in the present invention.

It therefore becomes a primary object of the present invention to provide a device which will extract the maximum amount of juice from citrus fruit without contamination by products from the rinds or the locular walls.

It is a further object of the present invention to provide a device of this kind which will give the desired pure juice without extensive subsequent treatment.

It is a further object of the present invention to provide a device which will permit the juice to flow from the extracting mechanism without coming into contact with oils which form part of the outer rind and which may have been separated therefrom by the operations necessary to cause extraction of the juice.

It is a further object of the present invention to provide a device which will extract the juice from the fruit without exerting a grinding or masticating action upon the locular walls or the rinds.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawing:

Figure 1 is a sectional elevational view of a machine embodying the present invention;

Figure 2 is a developed view of a portion of the device shown in Figure 1, taken on line 2—2 of Figure 1; and, Figure 3 is a fragmentary section taken on line 3—3 of Figure 2.

The machine in which the present invention is shown, consists essentially of means for halving the fruit, means for orienting the fruit halves, and means for moving the oriented fruit halves between a pair of cooperative pressure surfaces in such a manner that pressure is applied on the fruit between the outer rind and the cut surface to express the juice. The pressure surface engaged by the cut surface of the fruit has openings therein for passage of the juice, and it is with the formation of this perforated surface that the present invention is primarily concerned.

The whole fruit is fed by a conveyor belt 11 onto a rotating knife 10, which severs the fruit into halves. Means in the form of a cooperative supporting chute 12 and a deflector 9 is provided on opposite sides of the knife, for delivering the fruit halves from the knife to the space between the drums 13 and 14. The fruit halves are so delivered with their severed surfaces facing in the direction of the drum 14. This delivering device is fully described in my copending application, Serial Number 423,201, filed December 16, 1941, entitled "Fruit cutting and feeding device."

The drums 13 and 14 perform the initial pressing operation on the fruit halves, the drum 14 having spikes 15 on its surface which slit the leading edges of the fruit halves and position the halves so that they will be properly flattened in subsequent operations. The cylindrical surface of the drum 13 forms one of the pressure surfaces which performs the main extracting of the juice. Said drum has pins 16 extending from its pressure surface, which engage the rind of the fruit halves and convey the sections over a perforated pressure surface 17 with their cut surfaces bearing against said surface. The perforated surface 17 is arranged so that in conjunction with the cylindrical surface of the drum 13 it forms a converging passage. It can be seen that if the fruit halves are carried through this converging passage by the pins 16 as the drum 13 rotates, the halves will be subjected to a pressure between the rind and the cut surface, which will flatten out the fruit and force the juice and pulp into the openings 22 in the surface 17. The openings may be formed in any suitable material, but for convenience they are shown as being formed in a metal sheet, the necessary support therefor being obtained by means of castings of sufficient rigidity to support the metal plate against the pressure of the fruit halves on the inner surface of the plate.

It has been found that ordinary perforations in the surface 17 have a masticating effect upon the locular walls, and the white portions of the fruit, and, as can be seen from the preliminary discussion, this results in an unsatisfactory product, because such masticating action releases glucosides into the product. Furthermore, the perforations tend to become blocked by the solid material scraped off the fruit sections, and by bits of the locular walls torn loose. When this happens, the juice remains within the converging passage and is scooped up by the successive fruit sections, washing over the rind and over the oily drum surface, thus becoming contaminated by the rind oils. Also, unless the surface 17 is provided with perforations of a particular configuration and arrangement, the tonnage and capacity of the machine is limited by the inability of the juice to pass through the perforations in the short time the fruit is over the pressure surface 17. For these reasons, the particular structure shown is employed.

The support for the perforated sheet is preferably made in sections 18 merely for convenience in handling, each of these sections having a plurality of ribs 19 extending in a direction around the periphery of the drum 13. These ribs 19 are spaced apart and the juice is intended to run between them into the receiving trough 20. In order to increase the total free area at the surface of the plate 17, the ribs 19 of the grids 18 are provided with raised abutments 21, which form the actual supporting surface for the perforated plate 17. It can be seen that the perforations in the plate which fall between the ribs 19, or directly over the ribs 19 but between the abutments 21, will have a free passage for the juice past the grids 18 into the trough 20.

In order to permit the proper expulsion of the juice from the fruit and through the perforations 22 of the plate 17, it has been found desirable to make these perforations elongated. That is, they are elongated in the direction of travel of the fruit through the convergent pressure passage. This is readily apparent in Figure 2. In addition to this, it is desirable to stagger the perforations so that all parts of the cut surface of the fruit pass over the perforations. The use of these elongated, staggered holes assures that all parts of the cut surfaces pass over perforations, and that each individual area of the fruit is over a perforation for sufficient time to allow the proper expulsion of juice. Round, staggered holes can be used, with considerable reduction of the linear velocity of the fruit, but such reduction in linear velocity limits the capacity of the machine. In addition to this, the elongated openings seem to prevent retention of the juice between the rind and the plate 17 which retention would cause it to spray around in the converging passage and wash the surface of the drum 13 with attendant deleterious effects upon the quality of the product. The elongated openings also assure that a minimum amount of juice is retained by the rind and carried with the flattened rind out of the converging passage.

As was mentioned above the principal object of the present invention is to produce uncontaminated juice. For this reason the edges of the holes 22 are formed as is best shown in Figure 3, with a rounded edge 22' and a downturned lip on the trailing edges of the openings, or the edges last engaged by the fruit as it passes over the openings. These lips 23 perform several different functions. In the first place, they serve to prevent a cutting or tearing action by the plate on the fruit during its passage through the converging passage and thus prevent the introduction of glucosides into the juice. In the second place, they prevent the cutting off of shreds of pulp which would ordinarily soon block the openings 22. In the third place, they permit the shreds of pulp to remain attached to the peel and to be drawn back into the space between the pressure drum in the plate 17 as the fruit progresses along the plate 17. This last mentioned effect is advantageous as it causes the rupture of the juice sacs and expulsion of the juice therefrom by pressure between the interior rind and the unperforated portions of the plate 17, and thus the juice which comes into the trough 20 is contaminated as little as possible by solid matter which must be removed by straining. However, the chief advantage of the down-turned lip, or its equivalent, is the fact that perforations so formed do not tear the locular walls from the peel. The peel is delivered from the passage with substantially all of the locular walls adhering to the peel, and thus kept out of the juice.

It can be seen from the above that there has been provided a screen or perforated plate which is peculiarly adapted to the production of uncontaminated juice, because it expresses the juice by pressure, prevents it from coming into contact with the oil bearing rind or the pressure surface in contact therewith, and has been so formed as to prevent its having a masticating, cutting or tearing action on the fruit.

It is to be understood that variations in the structure may be practiced without departing from the advantages of the present invention.

I claim:

1. A thin plate adapted for use in a citrus fruit juice extractor, having a surface for engaging the cut face of the fruit and over which said fruit is moved under pressure by another member, there being openings through the plate to permit escape of the juice, said openings being substantially unobstructed and extending in a direction generally normal to said surface, whereby a short free passage is provided through the plate, the trailing edge of said openings being defined by a projection extending downwardly from said surface a substantial distance below said surface, whereby any portion of the fruit passing through the opening is prevented from engaging the under surface of the plate.

2. A thin plate adapted for use in a citrus fruit juice extractor, having a surface for engaging the cut face of the fruit and over which said fruit is moved under pressure by another member, there being openings through the plate to permit escape of the juice, said openings being substantially unobstructed and extending in a direction generally normal to said surface, whereby a short free passage is provided through the plate, said openings being long with respect to their width, the length of the openings extending generally in the direction of movement of the fruit.

3. A thin plate adapted for use in a citrus fruit juice extractor, having a surface for engaging the cut face of the fruit and over which said fruit is moved under pressure by another member, there being openings in the plate to permit escape of the juice, said openings having walls extending in a direction generally normal to said surface except for the trailing edges of the openings, said edges being rounded in a plane vertical to the surface where they meet the surface, whereby a substantially unobstructed and short free passage is provided through the plate.

4. A thin plate adapted for use in a citrus fruit juice extractor, having a surface for engaging the cut face of the fruit and over which said fruit is moved under pressure by another member, there being openings in the plate to permit escape of the juice, said openings having walls extending in a direction generally normal to said surface except for the trailing edges of the openings, said edges being rounded in a plane vertical to the surface where they meet the surface, whereby a substantially unobstructed and short free passage is provided through the plate, said openings being long with respect to their width, the length of the openings extending generally in the direction of movement of the fruit.

LAWRENCE A. FRY.